United States Patent [19]

Legvold et al.

[11] Patent Number: 5,404,500
[45] Date of Patent: Apr. 4, 1995

[54] STORAGE CONTROL SYSTEM WITH IMPROVED SYSTEM AND TECHNIQUE FOR DESTAGING DATA FROM NONVOLATILE MEMORY

[75] Inventors: Vern J. Legvold; Steven C. Cowley, both of Tucson, Ariz.

[73] Assignee: International Business Machines Corporation, Armonk, N.Y.

[21] Appl. No.: 993,250

[22] Filed: Dec. 17, 1992

[51] Int. Cl.⁶ .............................................. G06F 11/00
[52] U.S. Cl. ...................................... 395/575; 395/425
[58] Field of Search ............................... 395/575, 425, ; 364/244.1, 244.2, 244.3, 243.5, 244, 245.2, 245.3, 246.1, 246.3, 246.5, 255.7, 269.2; 371/66

[56] References Cited

U.S. PATENT DOCUMENTS

| | | | |
|---|---|---|---|
| 4,053,752 | 10/1977 | DeJohn et al. | 235/302.1 |
| 4,499,539 | 2/1985 | Vosacek | 364/200 |
| 4,598,357 | 7/1986 | Swenson et al. | 364/200 |
| 4,638,425 | 1/1987 | Hartung | 364/200 |
| 4,875,155 | 10/1989 | Iskivan et al. | 364/200 |
| 5,113,514 | 5/1992 | Alboneri et al. | 395/425 |
| 5,134,563 | 7/1992 | Taylor et al. | 395/250 |
| 5,195,100 | 3/1993 | Katz et al. | 371/66 |

FOREIGN PATENT DOCUMENTS 481716 10/1991 European Pat. Off. ...... G06F 12/08

Primary Examiner—Vincent P. Canney
Assistant Examiner—Norman M. Wright
Attorney, Agent, or Firm—Benman, Collins & Sawyer

[57] ABSTRACT

Improved system for destaging data from a nonvolatile memory. The system is operative after a failure of an associated first cache memory for which the nonvolatile memory stores backup data. The invention is adapted to scan the nonvolatile memory to identify control data stored therein. Next a directory structure is built from control information in the nonvolatile memory which is used to provide rapid access to data stored therein. In a particular implementation, the directory structure is stored as a plurality of pointers in data storage space allocated in a second cache. Data may then be destaged from the nonvolatile memory in a more efficient manner by which records from a particular track are grouped together.

16 Claims, 7 Drawing Sheets

STORAGE CONTROL SYSTEM WITH IMPROVED SYSTEM AND TECHNIQUE FOR DESTAGING DATA FROM NONVOLATILE MEMORY

BACKGROUND OF THE INVENTION

1. Field of the Invention

The present invention relates to computing systems. More specifically, the present invention relates to systems for increasing the fault tolerance of computing systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In large distributed computing systems, a plurality of host computers are typically connected to a number of direct access (permanent) storage devices (DASDs), such as a tape or disk drive unit, by a storage controller. Among other functions, the storage controller handles connection and disconnection between a particular computer and a DASD for transfer of a data record. In addition, the storage controller stores data in electronic memory for faster input and output operations.

The IBM Model 3990 storage controller, is an example of a storage controller which control connections between magnetic disk units and host computers. The host computers are typically main frame systems such as the IBM 3090, the Model ES9000, or other comparable systems.

The IBM 3990 Model 3 type controller can handle up to sixteen channels from host computers and up to sixty-four magnetic storage units. The host computers are connected to storage controller by at least one and by up to four channels. The storage controller typically has two storage clusters, each of which provides for selective connection between a host computer and a direct access storage device and each cluster being on a separate power boundary. The first cluster might include a multipath storage director with first and second storage paths, a shared control array (SCA) and a cache memory. The second cluster typically includes a second multipath storage director with first and second storage paths, a shared control array and a non-volatile store (NVS).

Thus, each storage path in the storage controller has access to three addressable memory devices used for supporting storage controller operation: the cache; the non-volatile store; and the shared control array. The three memory devices and asynchronous work elements (AWEs) comprise the shared structures of the 3990 control unit.

Cache is best known for its application as an adjunct to computer memory where it is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. Modified data in cache is duplicated in nonvolatile memory. Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to bring a record location into alignment with a transducer and the limited bandwidth of the magnetic transducer used to read and write the data. By duplicating frequently accessed data in cache, read time for data is reduced and data storage system throughput is considerably enhanced.

Nonvolatile storage (NVS) serves as a backup to the cache for the buffering function. Access to NVS is faster than access to a direct access storage device, but generally slower than cache. Data are branched to cache and to NVS to back up the cache in case of power failure. Data written to NVS have been treated as being as safe as if written to magnetic media. Upon staging of a data record to NVS indication is given to the host computer that the data are successfully stored. The NVS is required for Fast Write operations and to establish Dual Copy pairs. If cache is made unavailable, all Fast Write data will be destaged during the make unavailable process and no new Fast Write data will be written to the NVS until cache is made available. When cache is unavailable, the NVS is still required to maintain the bit maps defining the cylinders that are out-of-sync between ,the primary and secondary devices for Dual Copy.

A shared control array (SCA) is a memory array which is shared over all storage paths. There are typically two types of data in the SCA. The first is data to support the DASD and the second is the data to support the caching and extended functions (i.e. Fast Write and Dual Copy).

Another resource available to the mainframe computer may be an asynchronous work element (AWE). An AWE is a task performed by any processor by which data is taken from the cache and written or "destaged" to DASD. These structures control the internal work elements which control the asynchronous function required by the caching control unit (i.e. Pack Change, destaged modified data, cache space management, etc.)

The conventional storage control unit is typically designed so that no single point of failure in the unit will cause a failure of the entire system. The failure of certain components, however, can cause a degradation in performance of the control unit. A failure in cache, for example, typically results in such a performance degradation. Unfortunately, host systems have become tuned and therefore so reliant on the speed afforded by a fully functional cache, that the performance degradation associated with a failure in cache has an effect which is substantially similar to that of a single point failure.

The need in the art for a system and technique for mitigating performance degradation in a storage control unit associated with a failure in cache memory associated therewith is addressed by the invention of copending application entitled "STORAGE CONTROLLER HAVING ADDITIONAL CACHE MEMORY AND A MEANS FOR RECOVERING FROM FAILURE AND RECONFIGURING A CONTROL UNIT THEREOF IN RESPONSE THERETO", Ser. No. 07/993,248, filed Dec. 17, 1992 by B. C. Beardsley et al. A storage controller is provided with two cache memories and two nonvolatile storage memories. Each NVS memory backs up a cache memory across a power boundary. The storage controller also includes microcode for recovering from failure and reconfiguring the control unit thereof in response thereto. When DASD Fast Write is performed, the modified write data is transferred into the cache and NVS at the same time. The system is designed to provide continuous availability to extended function operations (e.g., DASD Fast Write and Dual Copy) even when a failure of cache or NVS occurs. (DASD Fast Write (DFW) is an operation in which data to be written to the storage device is written to cache and backed up in nonvolatile memory. Dual Copy involves a designation of and preservation of data for later backup to a storage device.)

However, when a cache fails, customer access to data must be delayed until it is determined whether the latest copy of the data is in DASD or in NVS. However, the NVS stores data in record format in a circular manner without a directory. Thus, all the data in the NVS must be unloaded (destaged) to the drive and then reread from the drive to provide the requested access. Unfortunately, inasmuch as data is stored circularly in NVS, if multiple records exist in the memory for a single track, the records are not destaged at the same time. Thus, multiple seek operations must be executed to position the drive head to write the individual records. Accordingly, the time required to destage data from an NVS may be substantial, on the order of 30 to 40 seconds for memories of typical size and more for larger NVS memories.

Hence, there is a need in the art for an improved system and technique for accessing data in nonvolatile backup memory on the failure of an associated cache.

SUMMARY OF THE INVENTION

The need in the art is addressed by the improved system for destaging data from a backup ( e.g. nonvolatile) memory of the present invention. The inventive system is operative after a failure of an associated first cache memory for which the nonvolatile memory stores backup data. The inventive system is adapted to scan the nonvolatile memory to identify control data stored therein. Next a directory structure is built from control information in the nonvolatile memory which is used to provide rapid access to the data. In a particular implementation, the directory structure is stored as a plurality of pointers in data storage space allocated in a second cache. Data may then be destaged from the nonvolatile memory in a more efficient manner by which records from a particular track are grouped together.

DESCRIPTION OF THE INVENTION

Illustrative embodiments and exemplary applications will now be described with reference to the accompanying drawings to disclose the advantageous teachings of the present invention.

Figure 1:
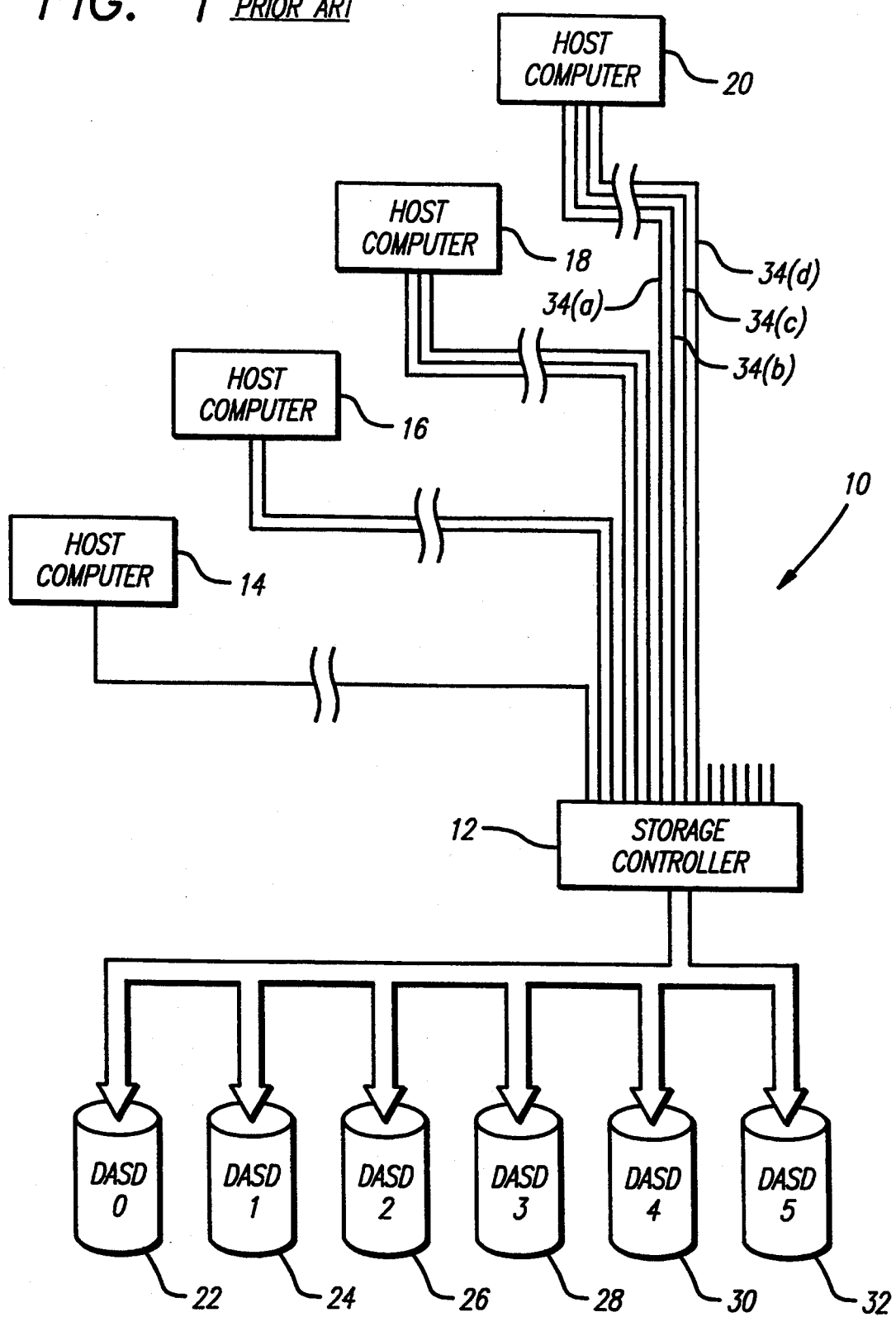
FIG. 1 is a high level block diagram of a data processing system.

FIG. 1 is a high level block diagram of a data processing system 10. The system 10 includes a storage controller 12, a plurality of host computers 14, 16, 18 and 20 and a plurality of direct access storage devices (DASD) 22–32. Presently, disk drive units are the most common type of DASD. In large multiple computer data processing systems, a large number of direct access storage devices serve several computers.

The storage controller 12 is logically positioned between the host computers 14–20 and the DASDs 22–32. The storage controller 12 handles connection and disconnection between a particular computer and magnetic disk unit for transfer of a data record.

The IBM Model 3990 storage controller, is an example of a storage controller used to control connections between magnetic disk units and host computers. The host computers 14–20 are typically main frame systems such as the IBM 3090, the Model ES9000, or other comparable systems.

The IBM 3990 Model 3 type controller can handle up to sixteen channels from host computers and up to sixty-four magnetic storage units. Hence, the host computers 14–20 are connected to storage controller 12 by at least one and by up to four channels. For example, the host computer 20 is connected to storage controller 12 by channels 34(a), 34(b), 34(c) and 34(d). Although four host computer systems and six direct storage devices are depicted in FIG. 1, the storage controller 12 can handle additional channels and direct access storage devices.

Figure 2:
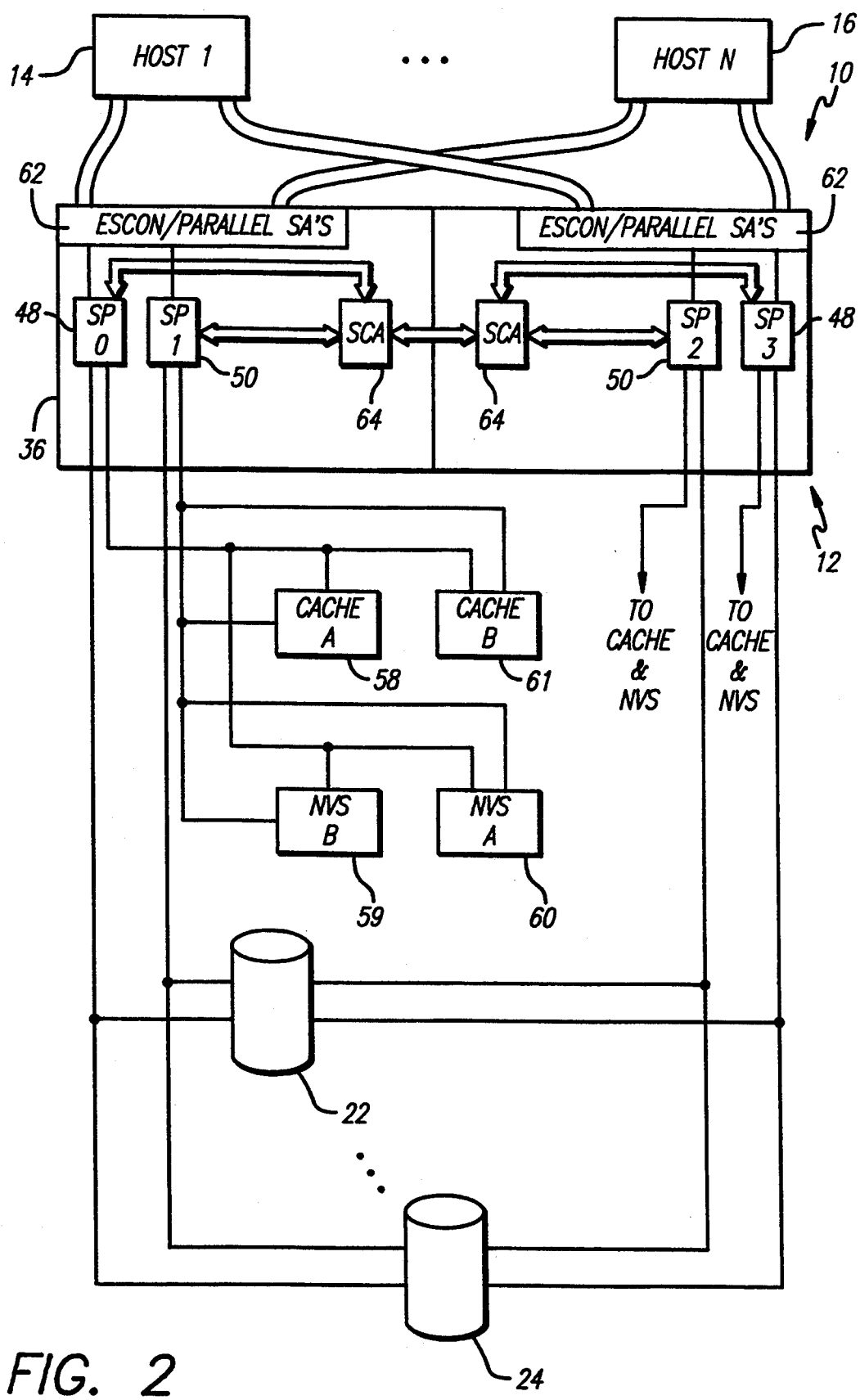
FIG. 2 depicts the storage controller of the data processing system of the present invention.

FIG. 2 depicts the storage controller 12 in greater detail. The storage controller 12 has two storage clusters 36 and 38, each of which provides for selective connection between a host computer and a direct access storage device. The clusters 36 and 38 are on separate power boundaries. Each cluster includes a first multi-path storage director 62 with associated storage paths 48 and 50, a shared control array (SCA) 64. The shared control arrays 64 of each cluster are interconnected as is known in the art. First and second cache memories (Cache A) 58 and (Cache B) 61 respectively, and first and second nonvolatile memories (NVS B) 59 and (NVS A) 60, respectively are provided. Each storage path of each cluster is connected to each cache memory and each nonvolatile memory for optimum reconfigurability as discussed herein. Data written to Cache A 58 is backed up in cross-paired nonvolatile memory NVS A 60. Likewise, data written to Cache B is backed up in cross-paired nonvolatile memory NVS B.

Figure 3:
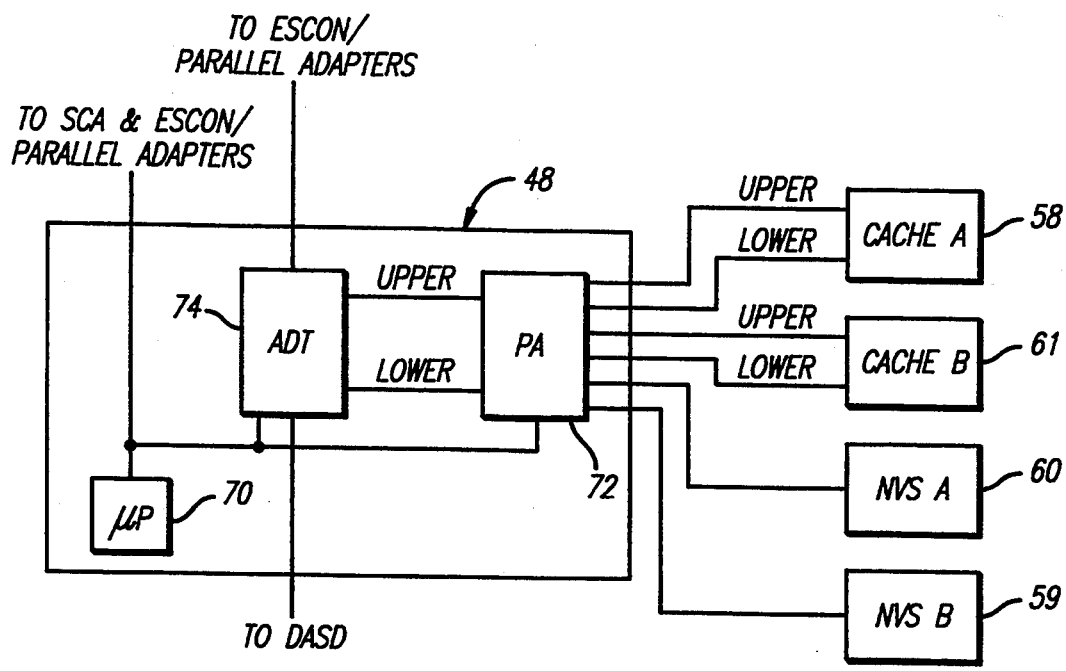
FIG. 3 is a block diagram of a storage path of the storage controller of the present invention.

FIG. 3 is a block diagram of a storage path. The storage path 48 is connected to a multipath storage director. Data transfer between the storage path 48 and one of the direct access storage devices during synchronous operations occurs via an automatic data transfer circuit 74. A port adapter 72 controls transfer of data between the cache memories 58 and 61, the nonvolatile memories 59 and 60 and DASD devices (not shown).

The cache and non-volatile memories provide for logical completion of certain data transfers without waiting for physical synchronization of disk and channel connection.

All operations of the storage path 48 are under control of a microprocessor 70. Processor control microcode is executed by the microprocessor in the storage path to control the operation of the storage controller. Hence, while each storage path is, in effect, a strand alone control unit based upon its own microprocessor, the storage paths share processor control information through the SCA 64 (not shown) for synchronization functions for handling connections, disconnections and reconnections relating to a transaction. Any scheme may be used to effect the connections and disconnections. U.S. patent application entitled USE OF CONFIGURATION REGISTERS TO CONTROL ACCESS TO MULTIPLE CACHES AND NONVOLATILE STORES, Ser. No. 07/992,368, filed Dec. 17, 1992 by Beardsley, et al., the teachings of which are incorporated herein by reference, discloses a particularly advantageous technique for effecting the necessary connections and disconnections.

Figure 4:
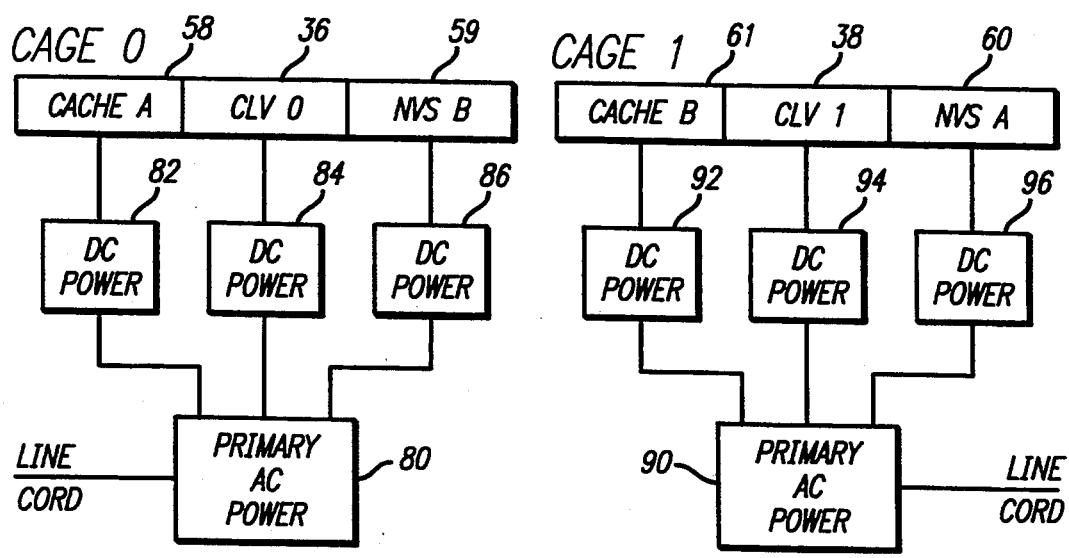
FIG. 4 is a block diagram illustrating the power management scheme of the storage controller of the present invention.

FIG. 4 is a block diagram illustrating the power management scheme of the storage controller. In each cluster, one of the cache memories and one of the nonvolatile memories are included within a separately powered cage. Thus, Cage 0 contains the first cluster 36, the first cache memory 58 and the first nonvolatile memory 59. Likewise, Cage 1 contains the second cluster 38, the second cache memory 61, and the second nonvolatile memory 60. Power is supplied to Cage 0 from wall power via a line cord and a conventional primary AC (alternating current) power supply 80. The primary AC power supply 80 supplies power to the first cache memory 58 via a first DC (direct current) power supply 82, to the first cluster 36 via a second DC power supply 84, and to the first nonvolatile store 59 through a third DC power supply 59.

The second cage (Cage 1) is powered via a second line cord and a second AC power supply 90. The second primary AC power supply 90 supplies power to the second cache memory 61 via a fourth DC power supply 92, to the second cluster 38 via a fifth DC power supply 94, and to the second nonvolatile memory 60 via a sixth DC power supply 96. As mentioned above, the cache memories and the associated backup memories are cross-paired on separate power boundaries. That is, Cache A is cross-paired with NVS A and Cache B is cross-paired with NVS B. In this arrangement, NVS A shadows Cache A. Likewise, Cache B is cross-paired with NVS B. Hence, a failure in power supplied to a cache will not necessarily mean that power will not be supplied to the associated nonvolatile backup memory.

During initial microcode load (IML), code is input via a conventional support facility (not shown) as described more fully in the above-referenced patent incorporated herein by reference and entitled USE OF CONFIGURATION REGISTERS TO CONTROL ACCESS TO MULTIPLE CACHES AND NONVOLATILE STORES. The code is run by the microprocessors 70. On the detection of a failure of nonvolatile memory, the microprocessors destage data from the associated (cross-paired) cache memory to other cache memories in the system. The detection of a failure of nonvolatile memory may be achieved in accordance with several schemes: 1) a hardware signals check during a data transfer operation that uses storage; 2) power loss may be detected in the failed component; 3) a time out waiting for a transfer to end may occur and/or 4) by error processing code in the microcode.

As discussed more fully in U.S. patent application entitled DYNAMIC RECORD CACHING ALLOCATION, Ser. No. 07/949,669, filed Sep. 23, 1992, by Beardsley et al., the teachings of which are incorporated herein by reference, data structures provide an indication as to what tracks are in cache, which cache and where in cache. The data structures are split between the shared control array(s) and cache. As records are modified, the modified data is stored in cache and in nonvolatile store. This is illustrated in simplified form in FIG. 5.

Figure 5:
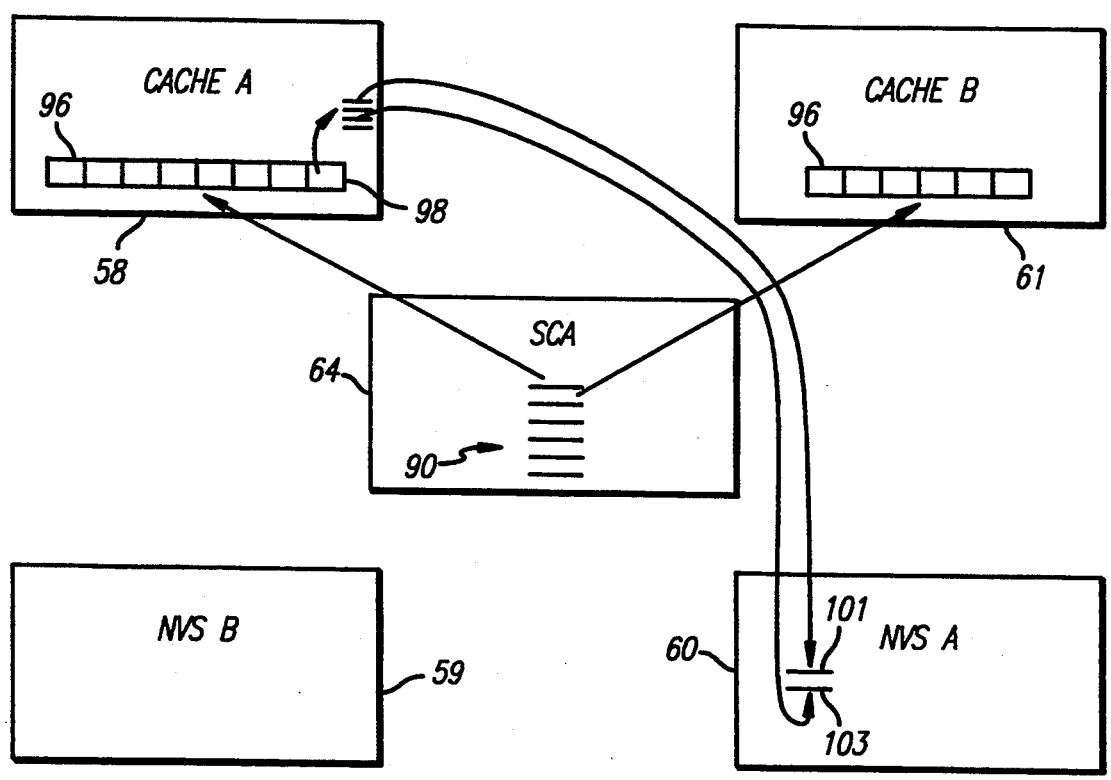
FIG. 5 is a simplified diagram illustrating the storage of data in the storage controller of the present invention.

FIG. 5 is a simplified diagram illustrating the storage of data in the storage controller of the present invention. As discussed in the above referenced patent application, modified fast write data is stored in cache. A scatter index table 90 in the shared control array 64 points to track and record directory entry tables (not shown). The track directory entry and record directory entry tables are used to compute the location of a track slot header or record slot header 96 in cache, e.g. Cache A 58. The slot header 96 in cache points to a segment in cache memory in which the data is stored and to an area in memory in which the associated track or record information block 98 is stored. The track information block 98 points to a location in associated, cross-paired nonvolatile memory (NVS A) 60 in which the modified data 101, 103 is stored. Likewise, a second entry in the scatter index table 90 points to a track slot header 96 in Cache B 61.

Figure 6:
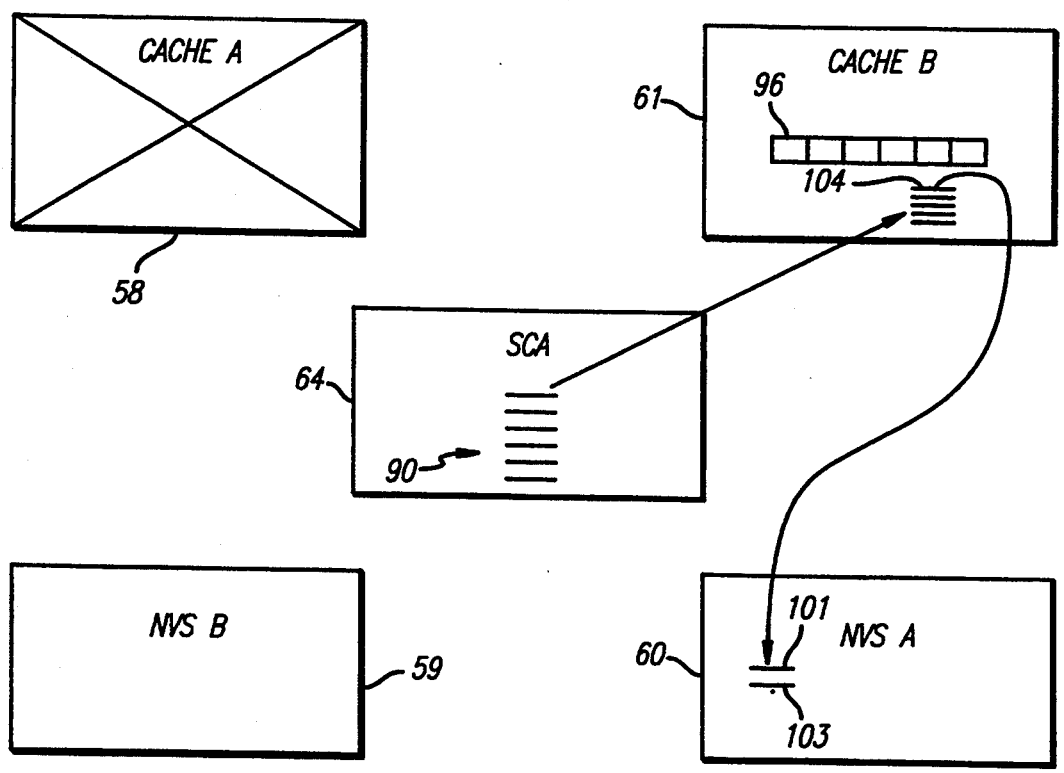
FIG. 6 is a simplified diagram illustrating the storage of data nonvolatile store after a cache failure in accordance with the present teachings.

FIG. 6 is a simplified diagram illustrating the storage of data in nonvolatile store after a cache failure. In accordance with the present teachings, when a cache (e.g. Cache A) fails, the cross-paired backup nonvolatile memory is scanned and a directory structure 104 is created in the fully functional cache, (Cache B). In the alternative, the directory structure 104 may be stored in a good area in the failed cache, in the shared control array 64 or in another auxiliary memory.

The directory structure 104 is stored in locations in cache in which the records would ordinarily be stored as data. The directory structure consists of a plurality of pointers to the record locations in the NVS. The scatter index table and associated track and record data entry tables are updated in the shared control array 64 to point to the directory structure 104 in the fully functional cache. The directory is then used to provide rapid access to data stored in the nonvolatile memory.

An asynchronous operation (AWE) is initiated to destage all modified data in the NVS. The directory 104 is used to group records that will be written to the same track to expedite the destage operation. If a request is made to access data in the NVS during the destage operation, the channel command word (CCW) chain will be interrupted with a channel command retry (CCR) and the destage operation is interrupted. The specific track requested is then destaged from the NVS. Thereafter, access to the requested track is permitted.

Figure 7A:
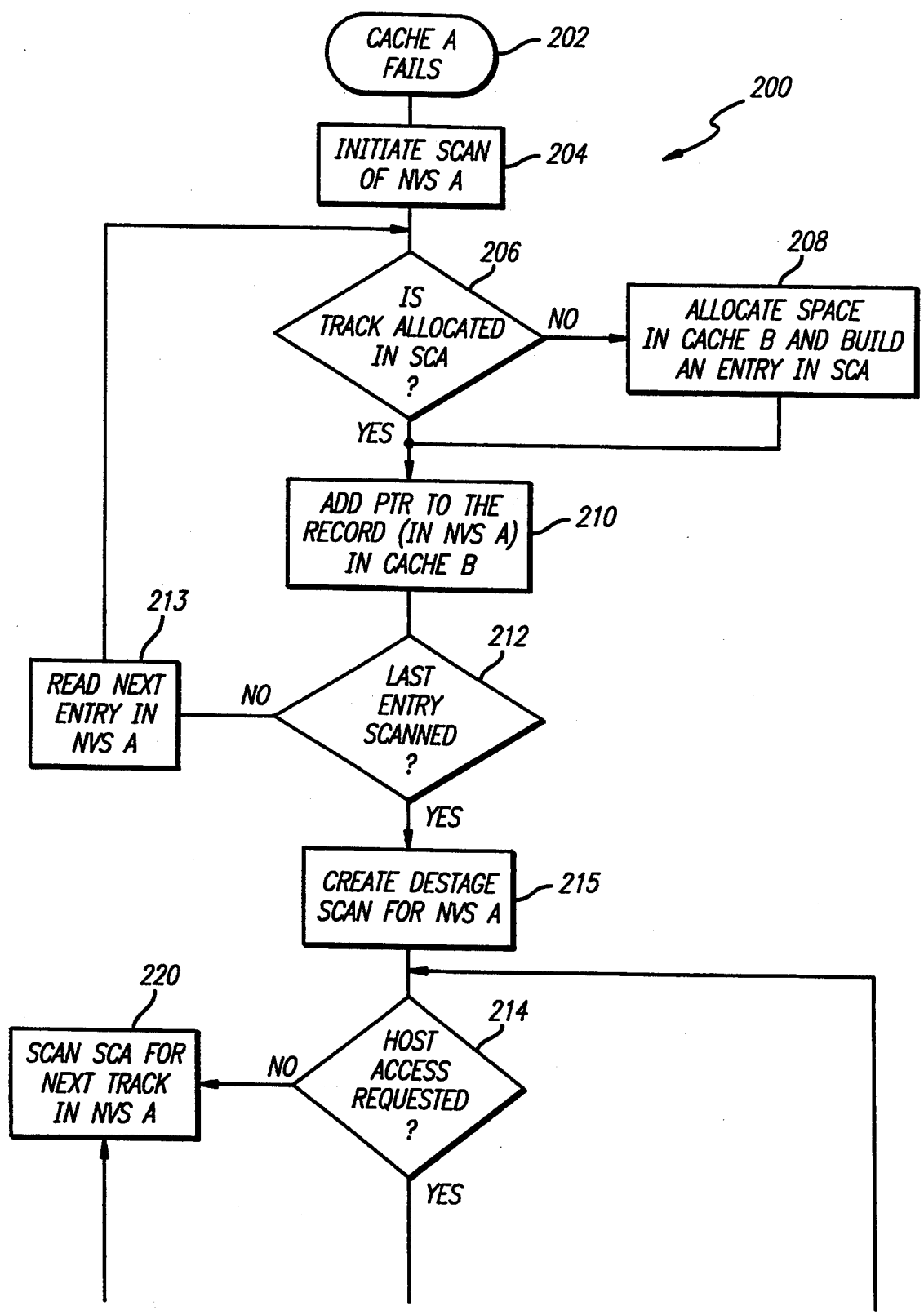
FIGS. 7A and 7B is a flow diagram illustrating the operation of the storage controller of the present invention.
Figure 7B:
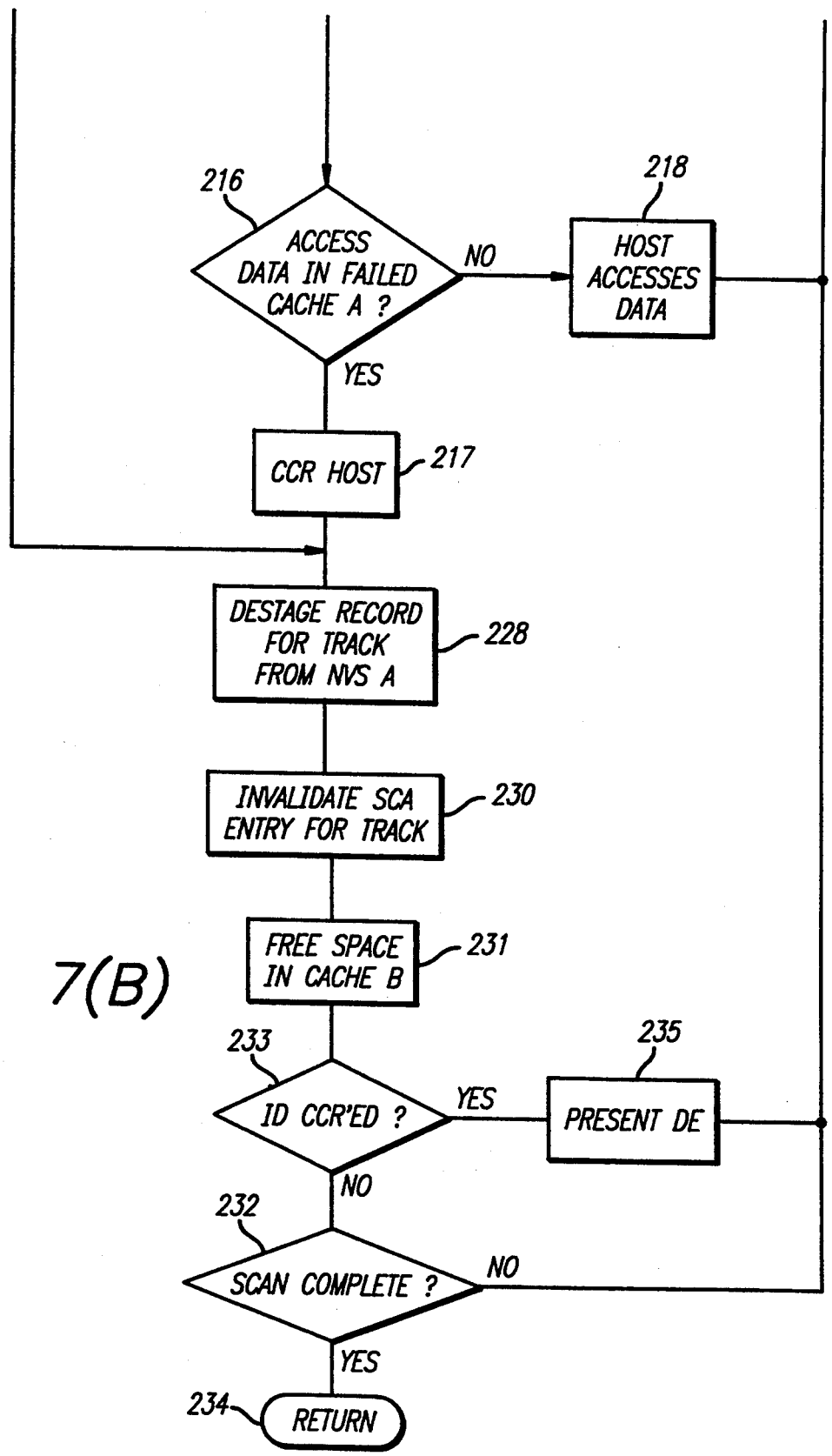

FIG. 7 is a flow diagram illustrating the operation of the storage controller of the present invention. When a cache fails, 202, the associated NVS is scanned 204. Next, a check is made 206 to determine if space is allocated in the fully functional cache in the shared control array for the track containing the record found in NVS A. If no space is allocated in the fully functional cache in the shared control array, space is allocated in the fully functional cache in the SCA at 208 and a pointer is stored in the space allocated in the fully functional cache 210 and the scan is continued 213. If space is already allocated for the track in Cache B, then a pointer is added to the NVS record in Cache B at 210. After the last entry is scanned 212, an AWE is initiated to destage NVS A and a check is made for a request for host access to stored data 214. If access is requested, another check is made to determine if the request is to access data in the failed cache 216. If not, access to fully functional components is permitted 218. If access to the failed component is requested, a CCR (channel command retry) signal is sent 217. If no access to data is requested the next track to be destaged is found 220. Records for the track are destaged from the NVS for that track 228 and the track pointer is invalidated in the SCA 230. The process is completed until all data is destaged from the NVS.

By way of example, in the IBM 3990 control unit, the following steps are performed for cache reinitialization in accordance with the present invention.

1. Set Control Unit Busy
2. Increment CFW ID: All Cache Fast Write (CFW) data is lost and incrementing the CFW ID is still required to inform the host of CFW data loss.
3. Initialize Directory Structures: Each scatter index (SCA) table chain is read and all directory entries for data in the failed cache are removed and placed on a Directory Entry Free List. The data in the other cache and their associated directory structures are not affected.
4. Scan the NVS associated with the failed cache: The control data in the NVS is read. A directory entry is initialized and added to the scatter index table chain for each unique track found in the NVS. A directory entry for a segment in the failed cache is allocated if the failing cache can be reinitialized. Otherwise, a directory entry in fully functional cache is allocated. A count of the number of records in the NVS for each track will be maintained in the directory entries. When a second record for the same track is encountered, the counter of the number of records in the NVS is incremented. The control information for each record in the NVS is stored in the segment associated with the directory entry for the track.
5. Schedule Asynchronous Destage of NVS Data: An asynchronous task is created to destage all modified data from the NVS. The control information for the oldest record in the NVS is read. The directory entry for the track and the control information saved in the cache for that track is used to destage all modified data for that track. After the track is destaged, the control information for the destaged records is updated to indicate that the NVS space is free. The directory entry for the track is then invalidated. In the alternative, the process of invalidating all directory entries in the failed cache and then rebuilding the entries based on data in the NVS could be replaced by a process that only invalidated entries that contain no modified data or CFW data. In the preferred embodiment, if the directory structures and the NVS are incongruent because of the error that caused the cache to fail, the directory entries are completely rebuilt. This allows use of directory entries for the other cache when the failing cache can not be reinitialized.
6. Host access to all data is allowed: If a host attempts to access a track that has modified data in the NVS, the control unit will present CCR status to the host. All modified records in the NVS for that track are destaged, the associated NVS space is freed and the directory entry is invalidated. The control unit reconnects to the channel and the host access can now be completed.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An improved system for destaging data from a backup integrated circuit memory after a failure of an associated first memory:
   means for scanning said backup memory to identify control data stored therein;
   means for building a directory structure from control information in said backup memory;
   means for destaging data from said backup memory after building said directory structure; and
   means for destaging records from said backup memory for a given track in a direct access storage device without repositioning a write head of said device.

2. The invention of claim 1 further including a second memory for storing said directory structure.

3. The invention of claim 2 wherein said second memory is a second cache memory.

4. The invention of claim 3 wherein said directory structure is stored as a plurality of pointers to said backup memory in space in said second cache allocated for data.

5. In a storage control system an improved system for destaging data from a nonvolatile integrated circuit memory after a failure of an associated first cache memory for which said nonvolatile memory stores backup data including:
   means for scanning said nonvolatile memory to identify control data stored therein;
   means for building a directory structure from control information in said nonvolatile memory;
   means for destaging data from said nonvolatile memory after building said directory structure and
   means for destaging records from said nonvolatile memory for a given track in a direct access storage device without repositioning a write head of said device.

6. The invention of claim 5 further including a second memory for storing said directory structure.

7. The invention of claim 6 wherein said second memory is a second cache memory.

8. The invention of claim 7 wherein said directory structure is stored as a plurality of pointers to said nonvolatile memory in space in said second cache allocated for data.

9. A storage control system comprising:

first cluster means for directing data from a host computer to a storage device said first cluster means being an interface control;

second cluster means for directing data from a host computer to a storage device; said second cluster means being an interface control;

a first cache memory connected to said first cluster means;

a second, cache memory connected to said second cluster means;

a first nonvolatile integrated circuit memory connected to said second cluster means to backup said first cache memory;

a second nonvolatile integrated circuit memory connected to said first cluster means to backup said second cache memory; and means for destaging data from said first nonvolatile memory after a failure of said first cache memory including:

means for scanning said first nonvolatile memory to identify control data stored therein;

means for building a directory structure from control information in said first nonvolatile memory;

means for destaging data from said nonvolatile memory after building said directory structure; and means for destaging records from said nonvolatile memory for a given track in a direct access storage device without repositioning a write head of said device.

10. The invention of claim 9 wherein said directory structure is stored in said second cache memory.

11. The invention of claim 10 wherein said directory structure is stored as a plurality of pointers to said nonvolatile memory in space in said second cache allocated for data.

12. In a storage control system an improved technique for destaging data from a nonvolatile integrated circuit memory after a failure of an associated first cache memory for which said nonvolatile memory stores backup data including the steps of:

scanning said nonvolatile memory to identify control data stored therein;

building a directory structure from control information in said nonvolatile memory; and destaging data from said nonvolatile memory after building said directory structure.

13. The invention of claim 12 further including the step of storing said directory structure in a second memory.

14. The invention of claim 13 wherein said second memory is a second cache memory.

15. The invention of claim 14 wherein said directory structure is stored as a plurality of pointers to said nonvolatile memory in space in said second cache allocated for data.

16. The invention of claim 12 including the step of destaging records from said nonvolatile memory for a given track in a direct access storage device without repositioning a write head of said device.

* * * * *